United States Patent [19]
Crees

[11] 3,809,366
[45] May 7, 1974

[54] APPARATUS FOR DRAWING CONDUCTOR WIRES THROUGH CONDUITS

[76] Inventor: Silas Ray Crees, P.O. Box 813, Eau Gallie, Fla. 32935

[22] Filed: Apr. 26, 1973

[21] Appl. No.: 354,490

[52] U.S. Cl... 254/134.3 FT, 15/104.3 SN, 226/168
[51] Int. Cl. .............................................. E21c 29/16
[58] Field of Search ............ 254/134.3 R, 134.3 FT; 15/104.3 SN; 226/168; 242/47.01

[56] References Cited
UNITED STATES PATENTS

| | | | |
|---|---|---|---|
| 594,020 | 11/1897 | Johnston | 254/134.3 R |
| 2,221,903 | 11/1940 | Abramson et al. | 254/134.3 FT |
| 3,343,809 | 9/1967 | Newell | 254/134.3 FT |
| 3,392,960 | 7/1968 | Bye | 254/134.3 R |
| 3,399,415 | 9/1968 | Hammond et al. | 15/104.3 SN |

FOREIGN PATENTS OR APPLICATIONS 248,703   4/1963   Australia......................... 242/47.01

Primary Examiner—Othell M. Simpson
Attorney, Agent, or Firm—Duckworth, Hobby & Allen

[57] ABSTRACT

A power driven tool for driving a flexible plastic rod or tube through a conduit for connection to a conductor wire and then pulling the flexible rod or tube with conductor wire attached thereto through the conduit. The flexible rod is driven by a rotatable friction drive such as a pulley or spiralling pulley in which the rod is wrapped around and driven through a flexible guide conduit for guiding the rod into an electrical conduit. A storage container is provided with a cone spool for storing the flexible rod.

9 Claims, 5 Drawing Figures

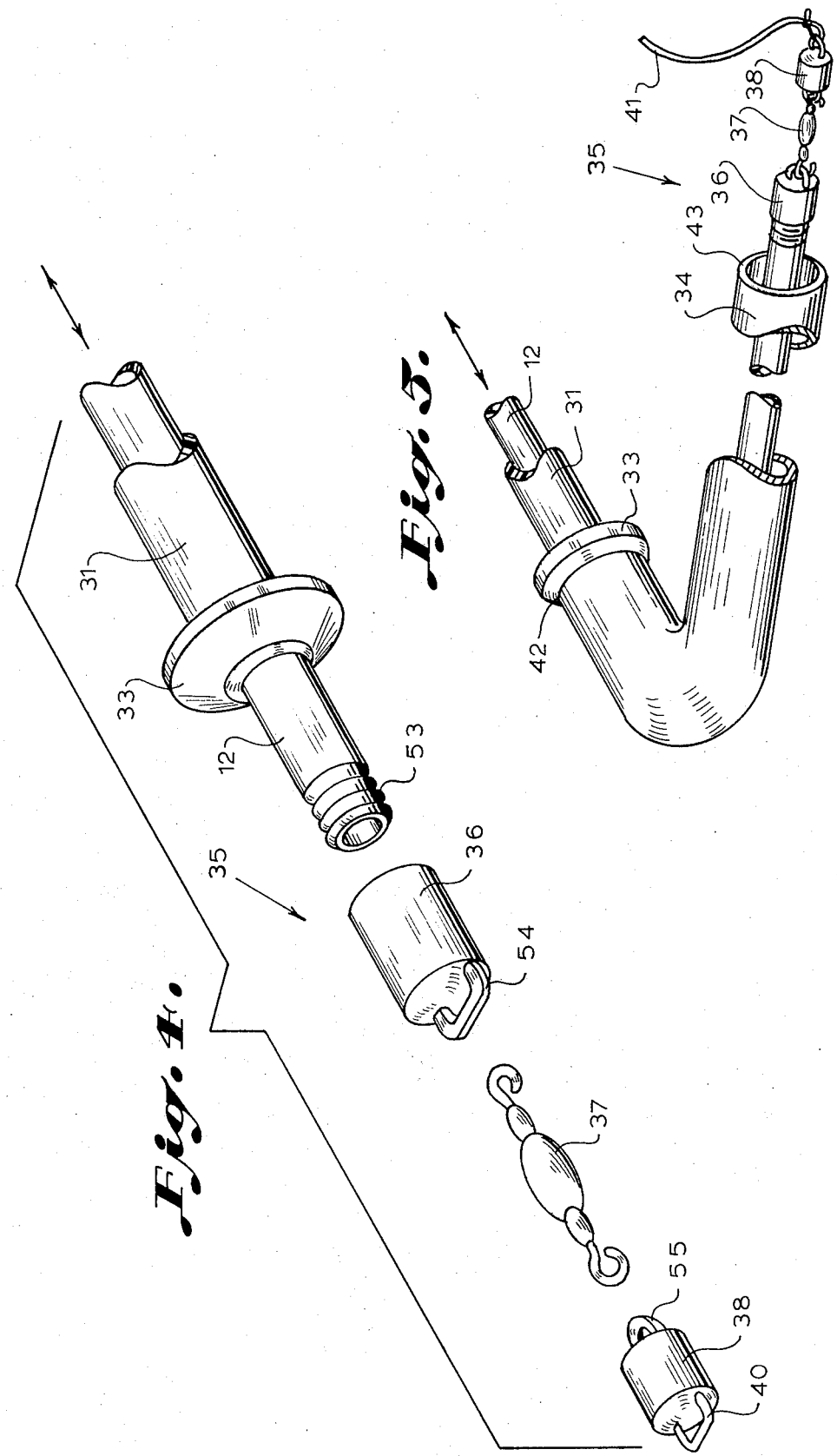

APPARATUS FOR DRAWING CONDUCTOR WIRES THROUGH CONDUITS

BACKGROUND OF THE INVENTION

The present invention relates to an apparatus for drawing conductor wires through electrical conduits which apparatus are sometimes called "fish tapes" and especially to an improved fish tape utilizing a flexible rod or tube of plastic driven by a rotating friction drive to drive a rod or tube through the electrical conduit and to pull the rod or tube back through the conduit with the conductor wire attached.

In the past it has been common practice for electrical contractors to connect conduits in a building connecting panel boxes with circuits throughout a building and then to pull the conductor wires through the conduit so that the central panel box is connected to various circuits such as switches, and the like. Pulling the electrical conductors through the conduit is a difficult and time-consuming job and is commonly performed in many ways such as pushing a fish tape, which is a spring steel rod or cable through the conduit, connecting the conductor to the end of the fish tape and then pulling the fish tape back through the conduit. This is satisfactory for smaller conductors and shorter distances. Larger conductors generally require larger tools which may include gearing or hoisting arrangements to give a mechanical advantage for pulling the cable and conductor through the conduit. It has also been suggested to utilize compressed air or gases for driving a small line through a conduit in which the line has a piston attached to the end thereof. Then a fish tape or rope is attached to the line pulled back through the conduit at such time, and the conductors are attached for the final pull of the installation. Finally, several arrangements have been suggested for power driving a fish tape through a conduit and one of these may be seen in U.S. Pat. No. 3,355,148 for a Fish Cable Tool, having mechanical gearing for driving a fish cable through a thin wall conduit and drawing the cable back therethrough. U.S. Pat. No. 3,610,582 illustrates a Motor-Driven Apparatus for Drawing Conductor Wires into Conduits, and includes an electric motor driven hand tool which drives a cable through a conduit by means of two pairs of driving discs driving against each other to feed the wire therebetween into a conduit and for reversing the motor for withdrawing the wire through the conduit. U.S. Pat. No. 2,729,424 illustrates a Portable Hand Tool which includes a spool for wrapping a wire upon, along with a motor-driven gearing for driving the wire through a conduit; while U.S. Pat. 3,258,246 for Wire Insertion Tool, illustrates yet another motor driven tool for feeding or paying out a metal tape through electrical conduits and for retrieving or pulling in the tape with the electrical conductor wire cable attached thereto in which an electric motor or drill drives a pair of wheels with the wire passing therethrough for driving and pulling the wire through the conduit.

The present invention, on the other hand, utilizes new materials and drive means for simplifying the operation of a fish cable tool which provides special storage for the fish cable.

SUMMARY OF THE INVENTION

The present invention relates to an apparatus for drawing conductor wires through conduits, sometimes called a fish tape or cable and includes a flexible rod or tube which may be made of plastic, but which may include fiberglass and which may be made of nylon, polypropylene, polyethylene, polyurethane, polytetrafluoroethylene or combinations of these or other polymers or various vinyl formulations and a flexible rod or tube storage container for storing the special flexible rod upon a fixed cone spool. A rod is referred to herein to include flexible plastic tubing which is a more commonly available material. A rotatable friction drive member may be shaped as a single or spiralling pulley, is connected to the storage container around the rotatable friction drive member and into a flexible guide conduit. The end of the flexible rod has a guide and conductor wire coupling means while the rotatable friction drive member is driven by an electric motor or drill to drive the flexible rod through the conduit guide into an electrical conduit where it can be attached to an electrical conductor wire and then drawn back through the conduit by the reverse operation of the rotatable friction drive member which places the rod back into the storage container. The flexible guide conduit may have a nozzle on the end for ease in insertion into the end of the electrical conduit.

BRIEF DESCRIPTION OF THE DRAWINGS

Other objects, features and advantages of this invention will be apparent from a study of the written description and the drawings, in which:

FIG. 4 is a perspective exploded view of the coupling end of the flexible tube;

FIG. 5 is a perspective view of flexible rod passing through a conduit.

DESCRIPTION OF THE PREFERRED EMBODIMENTS

Figure 1:
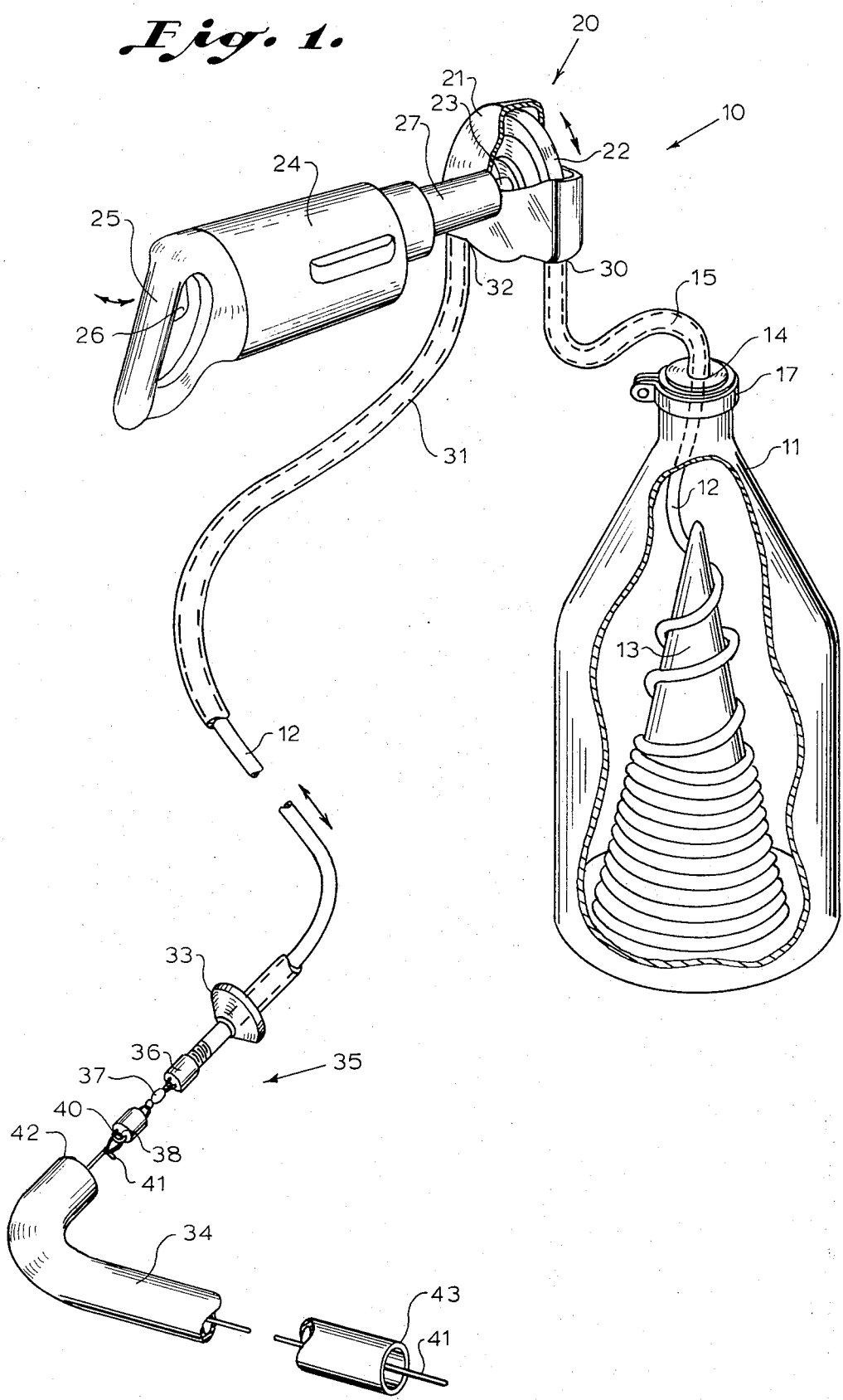
FIG. 1 is a perspective view of a fish cable apparatus in accordance with the present invention.

Referring to FIG. 1 of the drawing, a perspective view of the apparatus 10 is illustrated having a container 11 for the storage of a flexible tube or rod 12 therein. The container 11 has a cone-shaped spool 13 inside for flexible rod 12 to wrap around during the storage thereof, and has an opening 14 with a hollow conduit 15 protruding thereinto for the flexible rod 12 to pass into and out of the container 11. Flexible rod 12 is utilized in the present invention and is unlike other fish tapes in that it is made of a plastic or polymer material, or alternatively a fiberglass material combined with a polymer. Some of the materials used or contemplated include a solid nylon rod or tube or a nylon rod coated with polytetrafluoro ethylene and alternatively a polytetrafluoro ethylene rod or a polyurethane rod, or polypropylene or polyethylene tubing, in each case the rods being of solid or tubular material except that a flexible material such as fiberglass may be encapsulated in the polymer, if desired. The use of this material not only gives a sufficiently stiff material that it can be pushed through a conduit and also one that has lubricant properties to allow it to be easily slipped through the conduit while not being subject to corrosion and at the same time allowing a friction drive for the rod. The container 11 has a flexible conduit 15 attached thereto with a bracket 17. A rotatable friction drive system 20 has a casing 21 surrounding a rotating drive member 22 which may be a pulley for wrapping the rod 12 around for driving the rod 12 by the rotation of the rotatable drive member 22. The rotatable drive member 22 has a rotating shaft 23 fixedly attached thereto which passes through the casing 21 and is connected to a motor drive unit 24 which rotates the shaft 23 and the friction drive unit 22. Motor drive unit 24 may be an electric drill with a reverse drive, and can have a handle 25 with a trigger 26 for operating the unit. A coupling bracket 27 attaches the drive unit 24 to the casing 21 and the shaft 23 is connected to a chuck, or the like, located in the bracket 27. The conduit 15 is attached at one entrance 30 to the casing 21 and a hollow conduit 31 is attached to another exit 32 of the casing 21. Conduit 31 may be a flexible conduit as is commonly used on flexible drive units and has the flexible rod passing therethrough after passing over the pulley drive member 22. The end of the flexible conduit 31 has a nozzle 33 which is used in inserting the unit up to an electrical thin-wall conduit 34 and acts as a stop and holding member for the end of the conduit 34. The end of the rod 12 has an electrical conductor attaching member 35 which includes a threaded coupling 36 for attaching member 35 to the rod 12 and includes a swivel 37 which allows the actual attaching portion 38 to swivel on the end of the rod 12. The end portion 38 has an opening 40 which allows an electrical conductor 41 to be attached thereto for pulling through a conduit 34. In operation, the apparatus 10 is placed next to the end of a conduit 34 which is to have an electrical conductor 41 drawn therethrough and the nozzle 33 is placed against the end 42 of conductor 34 with the conductor coupling guide end 35 pushed into the conduit 34. Electric drive unit 24 is then actuated by pulling the trigger 26 which drives the rod 12 over the friction drive unit 22, forcing it from the storage container 11 through the conduit 15 around the pulley drive unit 22 through the flexible conduit 31 and driving it through the conduit 34 at its opposite end 43. An electrical conductor 41 may be connected to the end portion 38 of attaching member 35 and then the drive unit 24 may be reversed for pulling the rod 12 back through the conduit 34 along with the electrical conductor 41. The rod is pulled back through the flexible conduit 31 by the rotation of the friction drive 22 and then back into the storage container 11. The simplicity of this system allows for ease of operation as well as ease of maintenance of the unit.

Figure 2:
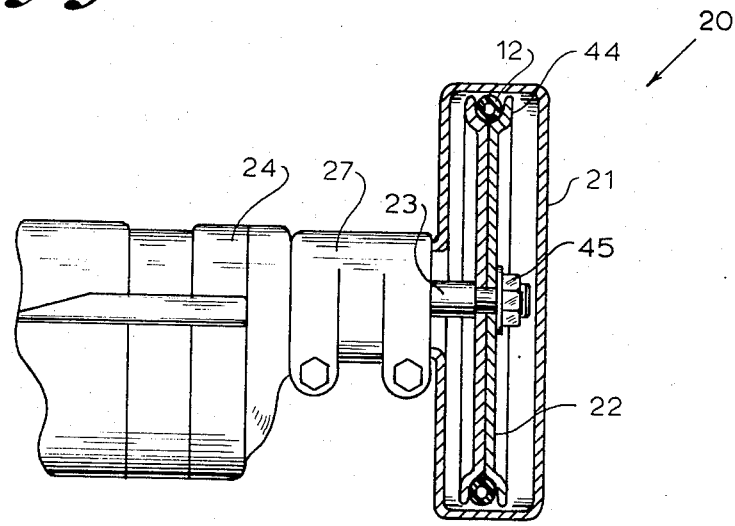
FIG. 2 is a cutaway sectional view of the friction drive unit of the embodiment of FIG. 1.

Referring now to FIG. 2, a cutaway view of the drive unit 20 is illustrated in which the rotating friction drive member 22 has an arcuate end 44 which is pulley-shaped for the rod 12 to be wrapped around, and is enclosed in the casing 21. The shaft 23 is attached with a nut and washer 45 to the friction drive member 22 onto the electric motor power drive unit 24 which is attached to the casing 21 by the coupling bracket 27.

Figure 3:
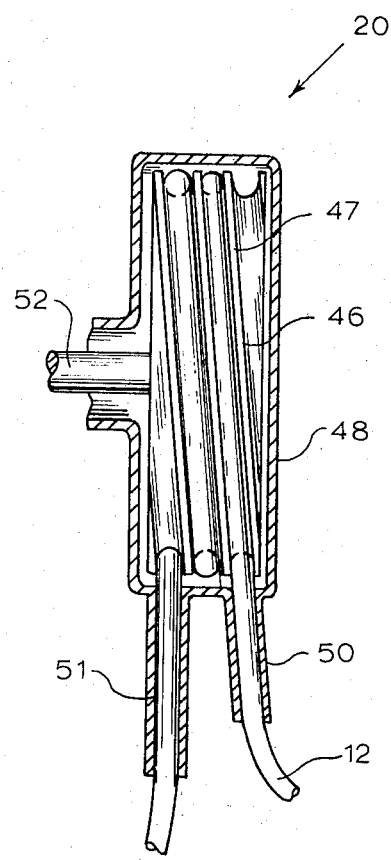
FIG. 3 is a cutaway sectional view of a second embodiment of a frictional drive unit in accordance with the present invention.

FIG. 3 illustrates another embodiment of the drive unit 20 in which additional frictional driving force is obtained for a rod 12 by having a spiral or helical friction drive member 46 which allows the rod 12 to make several wrappings for maintaining giving arcuate pulley edge 47 additional frictional engagement between the drive member 46 and the rod 12. The rod 12 enters the casing 48 at one opening 50, passes around several loops of the drive unit 46 and out a second opening 51 and is driven by shaft 52 connected to a power drive unit 24 as illustrated in FIG. 1.

FIG. 4 illustrates an exploded view of the attaching member 35 which is connected to flexible hollow rod 12 which has a threaded end 53 and plug 49 filling one end. A threaded coupling 36 is attached to the threaded end 5 by threaded coupling 36; has a metal loop 54 to which one end of a swivel 37 is attached and the other end of the swivel is attached to a conductor coupling member 38 having an opening 40 for attaching a conductor to, and an opening 55 at the opposite end for attaching to the swivel 37. This allows the conductor passing through the conduit to twist and turn without placing undue torque upon a flexible rod 12. Flexible rod 12 passes through the flexible conduit 31 which has the nozzle 33 attached thereto, is also illustrated in this view.

FIG. 5 illustrates the flexible rod 12 passing through a conduit 34 with a nozzle 33 of the flexible conduit 31 pushed against the end 42 of the conduit 34 and the conductor attaching member 35 passing out the other end 43 of the conduit 34 and having the electrical conductor 41 attached to member 38 which is in turn attached to the swivel 37 and to the threaded coupling 36. The rod 12 at this point may be pulled back through the conduit 34 pulling the electrical conductor 41 therethrough.

It should be clear at this point that a fish tape has been provided which utilizes a new material for the tape or cable which provides advantages over the typical steel wire and which also provides a simplified drive for driving the flexible cable as well as allowing the use of an inexpensive flexible guide conduit for directing the cable into an electrical thin wall conduit. Rod and tube as referred to are interchangeable herein in that the rod may be hollow and may include commonly available flexible polymer tubing. In addition, it should be noted that a special storage container is provided for the flexible driving rod. However, it should be clear that this invention is not to be construed as limited to the particular forms disclosed herein since these are to be regarded as illustrative rather than restrictive.

I claim:

1. An apparatus for drawing conductor wires through conduits comprising in combination:
 a. flexible rod;
 b. flexible rod storage container for storage of said flexible rod;
 c. rotatable friction drive means having said flexible rod wrapped at least partially therearound;
 d. flexible conduit guide means operatively connected to said rotatable friction drive means for guilding said flexible rod from said rotatable friction drive means into and out of a conduit;
 e. power means for rotating said rotatable friction drive means to draw said flexible rod from said storage container past said friction drive means and through said flexible conduit guide means; and
 f. conductor coupling means attached to the one end of said flexible rod for attaching a conductor wire to be drawn through a conduit. therearound 2. The apparatus in accordance with claim 1 in which said rotatable friction drive means includes a pulley having a flexible rod wrapped partially therearound.

3. The apparatus in accordance with claim 1 in which said rotatable friction drive means having a spiral pulley having said flexible rod wrapper herearound at least one full turn.

4. The apparatus in accordance with claim 1 in which said flexible conduit guide means has an angle nozzle on one end thereof.

5. The apparatus in accordance with claim 4 in which said flexible rod storage container has a cone shaped spool therein for wrapping said flexible rod around during storage.

6. The apparatus according to claim 1 in which said flexible rod is polytetrafluoro ethylene coated rod.

7. The apparatus according to claim 1 in which said flexible rod is a nylon rod.

8. The apparatus according to claim 1 in which said flexible rod is a polyurethane rod.

9. The apparatus according to claim 1 in which power means is a reversible electric motor driving a shaft operatively coupled to said rotatable friction drive means and being attached to the casing of said rotatable friction drive means.

* * * * *